US005091793A

United States Patent [19]

Goto et al.

[11] Patent Number: 5,091,793

[45] Date of Patent: Feb. 25, 1992

[54] OPTICAL HEAD

[75] Inventors: Shoji Goto; Akihiro Sakata; Hiroshi Yamamoto; Tetsuo Saimi; Kazuo Momoo, all of Osaka, Japan

[73] Assignee: Matsushita Electric Industrial Co., Ltd., Japan

[21] Appl. No.: 634,849

[22] Filed: Dec. 27, 1990

[30] Foreign Application Priority Data

Dec. 28, 1989 [JP] Japan ........ 1-342680

[51] Int. Cl.$^5$ ........ G02B 7/18

[52] U.S. Cl. ........ 359/831; 359/819; 359/896; 359/823

[58] Field of Search ........ 350/252, 247, 255, 321, 350/286, 287; 369/100, 118, 120, 128, 43, 44.12, 44.14

[56] References Cited

U.S. PATENT DOCUMENTS 3,767,293 10/1973 Baker et al. ........ 359/831
3,860,328 1/1975 Baker et al. ........ 359/831
4,441,818 4/1984 Wickman ........ 359/831
4,911,534 3/1990 Beyersberger van Henegouwen et al. ........ 359/823
4,912,693 3/1990 Goda ........ 359/823

*Primary Examiner*—Loha Ben
*Attorney, Agent, or Firm*—Lowe, Price, Leblanc & Becker

[57] ABSTRACT

An optical head for recording and reproducing information on an optical disk includes a box-like cover carrying thereon a semiconductor laser unit and a detector, and a substantially planar base on which various optical components are bonded, the base being made of the same material as the box-like cover and secured to the box-like cover to close an open end of the latter. By the use of the planar base, the optical components and the base can be bonded efficiently with utmost ease.

6 Claims, 3 Drawing Sheets 35 34 25 24 20 23 37 26 30 39 40 38 31 29 36 28 27 32 33

OPTICAL HEAD

BACKGROUND OF THE INVENTION

1. Field of the Invention

The present invention relates to an optical head for recording information on an optical disk or reproducing information from the optical disk.

2. Description of the Prior Art

In recent years, with the spread of optical disk drives as an external storage for consumer equipment or computers, demand for a compact and flat optical disk drive had increased.

As a result of miniaturization and thinning, the optical disk drive has a large packaging density which gives rise to a problem of low efficiency of assembling and adjusting operation.

More specifically, an optical head is a central and main component of the optical disk drive and has a considerable effect on the miniaturization and thinning of the optical disk drive. It is, therefore, desirable that the optical head should be constructed compactly and less thick without lowering the efficiency of assembling operation.

Conventional optical heads, as shown in FIG. 5 of the accompanying drawings, include a semiconductor laser unit 1 having, as a single unit, a collimating lens, a semiconductor laser and a high-frequency superimposed circuit for exciting the semiconductor laser, and a detector 2 for detecting the reflected light from an optical disk and producing a servo signal and an information signal. The semiconductor laser unit 1 and the detector 2 are screwed to a side wall of a head box 3. The head box 3 has on its bottom surface a plurality of lands 4 through 8 to which optical components such as prisms and mirrors are bonded. The land 4 supports thereon a beam shaping prism 9. The land 5 supports thereon a composite beam splitter 10 comprised of a combination of a beam shaping prism and a deflection beam splitter. The land 6 supports thereon a mirror 13 for directing light from the semiconductor laser unit 1 to an objective lens 12 of an objective lens actuator 11. The lands 7 and 8 support respectively thereon an analyzer 14 and a split prism 15 for directing the reflected light from the optical disk to the detector 2. The head box 3 is closed by a cover 16 screwed to the head box 3. The objective lens actuator 11 is screwed to the cover 16 in such a condition that the center of the intensity distribution of light coming from the semiconductor laser unit 1 is located at the center of the objective lens 12.

A pickup lens 17 is secured to the bottom surface of the head box 3 along a slit 18 in the bottom surface by means of screws (not shown) extending from the underside of the head box 3.

The prisms and mirrors 9, 10, 13–15 are made of plastic or glass. The head box 3 is an aluminum die-cast, in general. In view of the materials used, an ultraviolet-curing adhesive is generally used for bonding the prisms and mirrors 9, 10, 13–15 and the head box 3.

With this construction, the conventional optical head encounters difficulties in assembly when the prisms and mirrors are bonded to the lands 4–8 of the head box 3.

The prisms and mirrors 9, 10, 13–15 must be bonded while keeping the positional relationship in a highly precise manner. To this end, a jig is placed on the top or the side of each optical component for positioning the same. However, since the lands to which the optical components are to be bonded are surrounded by a relatively high side wall of the head box 3, a smooth placement or setting of the jig is impossible. The high side wall of the head box 3 further limits the degree of freedom in designing each jig and hence the resultant jig is complex in construction and uneasy to handle.

Furthermore, when all positioning jigs are set, an open end of the head box 3 is substantially closed by the jigs. In this condition, the bonding surface is no longer irradiated with ultraviolet rays which is used for curing the adhesive. In view of this difficulty, bonding operation is performed repeatedly from one optical component to another. Accordingly, the assembling efficiency of the conventional optical head is considerably low. The foregoing problems become more significant as the packaging density resulting is increased as a result of miniaturization and thinning of the optical head.

SUMMARY OF THE INVENTION

With the foregoing drawbacks of the prior art in view, it is an object of the present invention to provide an optical head which is compact in size and low in height and can be manufactured at a low cost.

According to the present invention, there is provided an optical head for recording and reproducing information on an optical disk, which comprises: a semiconductor laser unit; a detector for detecting reflected light from the optical disk; a cover having a substantially U-shaped cross section and carrying thereon the semiconductor laser unit and the detector; at least one first optical component secured by bonding to a substantially planar base and constituting a first optical system acting on a light beam emitted from the semiconductor laser unit, the first optical component including a beam shaping prism, a deflecting beam splitter or a composite prism comprised of a combination of the beam shaping prism and the deflecting beam splitter; and at least one second optical component secured by bonding to the base and constituting a second optical system acting on the reflected light returning from the optical disk, the second optical component including a prism or a mirror, wherein the cover is secured to the base and covers the first and second optical components.

Preferably, the base to which the optical components are bonded is made of the same material as the cover. When the head temperature is changed, the inner strain of the base is generated. This inner strain affects the optical distortion and aberration.

In assembly, the optical components are bonded to the substantially planar base. Subsequently, the base is secured to the cross-sectionally U-shaped cover to close an open end of the cover to which the semiconductor laser unit and the detector are mounted. Since the optical components such as prisms and mirrors are disposed on the planar base, a wide space is available around the optical components when the components are bonded. With this wide surrounding space, a positioning jig can be designed without limitation and hence the resultant jig can position all the optical components at one time. Due to the absence of a side wall extending around the optical components, the bonding surface can be irradiated uniformly and effectively by ultraviolet rays used for curing an adhesive.

The base to which the optical components are bonded can be made of a material of high light transmission. Thus, the ultraviolet rays may be projected onto the backside of the base. This mode of irradiation considerably increases the assembling efficiency of the optical head.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE PREFERRED EMBODIMENT

Figure 1:
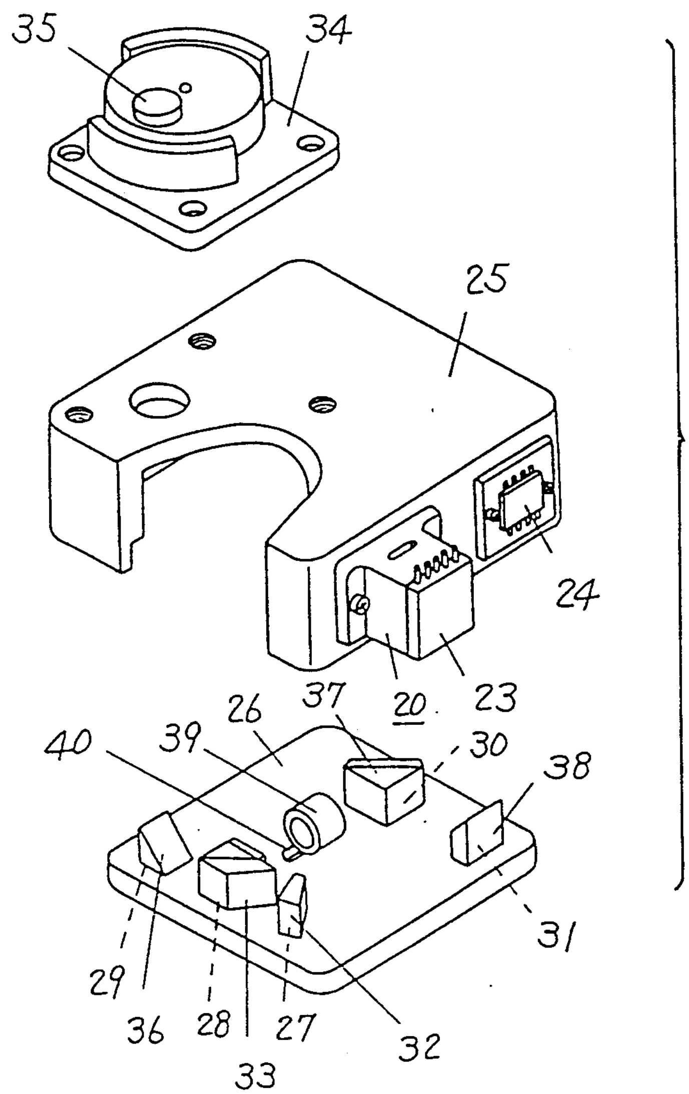
FIG. 1 is an exploded perspective view of a main portion of an optical head according to the present invention.
Figure 2:
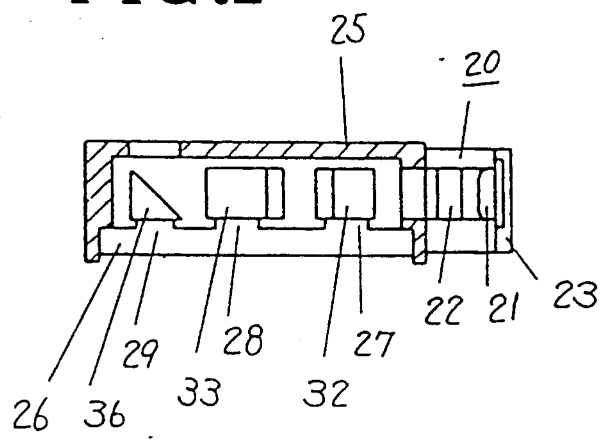
FIG. 2 is a schematic vertical cross-sectional view of the optical head.

Referring to the drawings, there is shown in FIGS. 1 and 2 an optical head according to a first embodiment of this invention.

The optical head includes a semiconductor laser unit 20 having, as a single unit, a semiconductor laser 21 (FIG. 2), a collimating lens 22 (FIG. 2), and a high-frequency superimposed circuit 23 for exciting the semiconductor laser 21, and a detector 24 (FIG. 1) for detecting the reflected light returning from an optical disk (not shown) and producing a servo signal and an RF signal. The semiconductor laser unit 20 and the detector 24 are secured by screws (not designated) to a side wall of a box-like cover 25. The cover 25 has a substantially U-shape in cross section and, in general, it is made of an aluminum die-cast or an engineering plastic.

The optical head also includes, preferably, a substantially planar base 26 of the same material as the box-like cover 25. The base 26 and the box-like cover 25 jointly constitute a hollow body of the optical head. The base 26 has on its one surface a plurality of lands 27 through 31 to which various optical components such as prisms and mirrors are secured by bonding. The lands 27, 28 support respectively thereon a beam shaping prism 32 and a composite beam splitter 33 comprised of a combination of a beam shaping prism and a deflecting beam splitter. The beam shaping prism 32 and the composite beam splitter 33 constitute a first optical system acting on a light beam emitted from the semiconductor laser unit 20. The land 29 supports thereon a mirror 36 for directing light from the semiconductor laser unit 20 to an objective lens 35 of an objective lens actuator 34. The lands 30, 31 support respectively thereon an analyzer 37 and a split prism 38 for directing the reflected light from the optical disk to the detector 2. The analyzer 37 and the split prism 33 constitute a second optical system acting on the reflected light returning from the optical disk. The planar base 26 has a slit 40 along which a pickup lens 39 is secured to the base 26 by screws (not shown) extending from the backside of the base 26.

The planar base 26 thus united with the optical components such as prisms and mirrors is secured to the box-like cover 25 by screws or an adhesion, so that the optical components are covered or concealed by the cover 25. In other words, an open bottom end of the box-like cover 25 is closed by the planar base 26.

The objective lens actuator 34 is screwed to the cover 25 in such a condition that the center of the intensity distribution of light coming from the semiconductor laser unit 20 is located at the center of the-objective lens 35.

A further description will be given to the manner in which the optical components 32, 33, 36–38 such as prisms and mirrors are bonded to the planar base 26.

Due to the highly precise positional relationship required between these optical components, the bonding operation is performed using a bonding jig. As a consequence, the efficiency of assembling the optical head is greatly influenced by the nature of the bonding operation.

According to this invention, the optical components 32, 33, 36–38 are bonded to the planar base 26 so that a substantially non-limited space is provided around the optical components and the base 26. The design of a jig is no longer subject to substantial limitation and, therefore, the resultant jig is easy to handle.

When a photo-setting adhesive such as an ultraviolet-curing adhesive is used for bonding the optical components to the base 26, light can be effectively projected onto such adhesive due to the absence of a wall surrounding the optical components.

Since the cover 25 and the base 26 are formed of the same material, they are substantially free from thermal distortion even when subjected to temperature changes.

Figure 3:
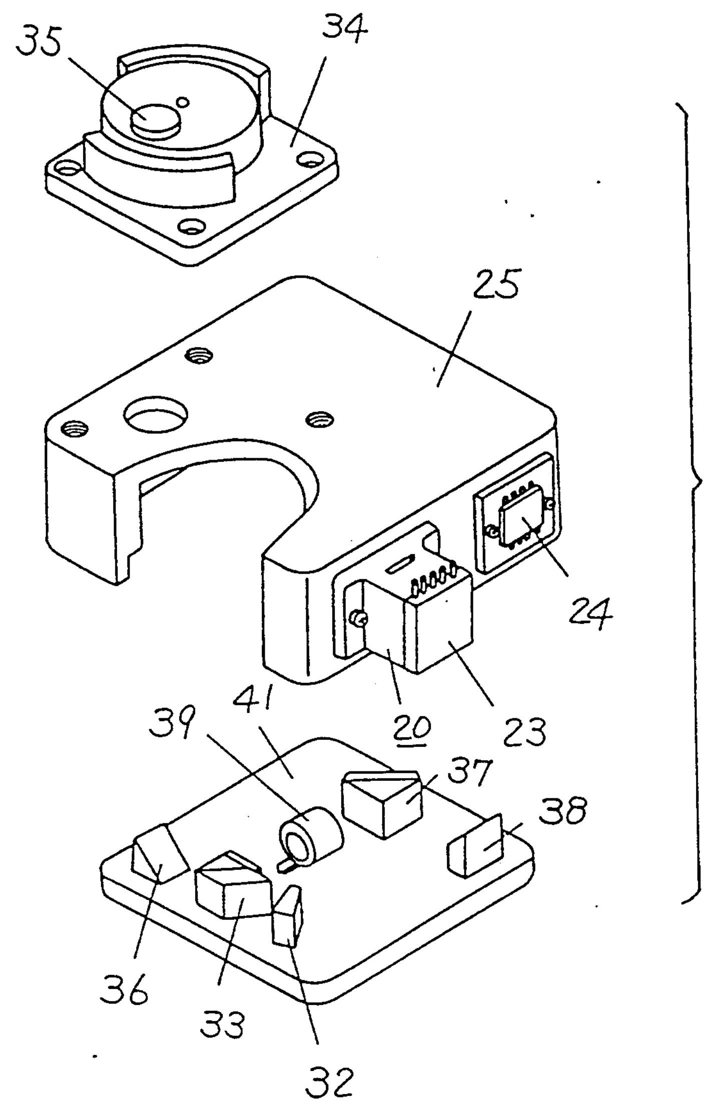
FIG. 3 is an exploded perspective view of a main portion of a modified optical head according to this invention.
Figure 4:
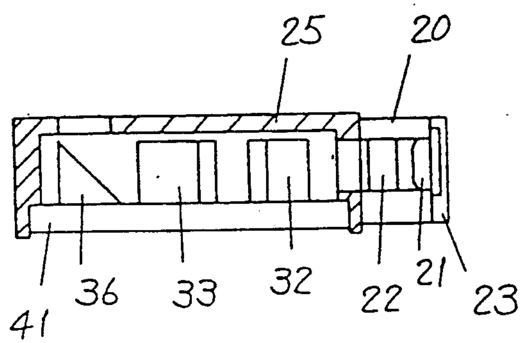
FIG. 4 is a schematic vertical cross-sectional view of the modified optical head.
Figure 5:
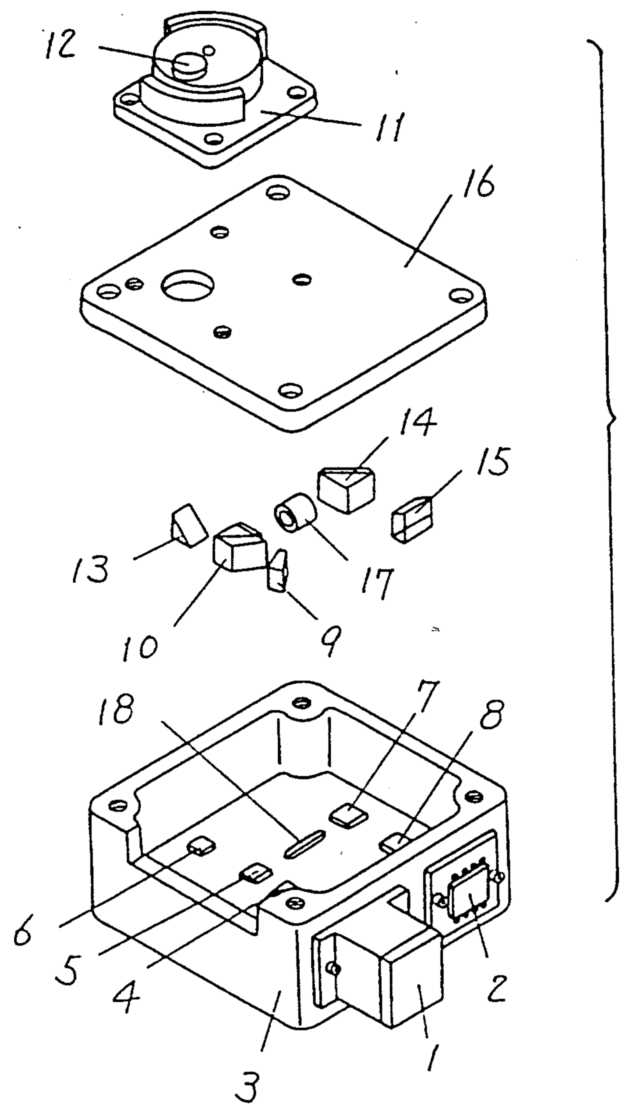
FIG. 5 is an exploded perspective view of a main portion of a conventional optical head.

FIGS. 3 and 4 show an optical head according to a second embodiment of this invention. These parts which correspond to those of the foregoing embodiment are designated by identical reference characters and hence a further description is no longer needed.

The optical head includes a planar base 41 made of a material of high light transmission and having a flat surface on which a beam shaping prism 32, a composite beam splitter 33 and a mirror 36 are bonded. The optical components 32, 33, 36 jointly constitute a first optical system acting on a light beam emitting from a semiconductor laser unit 20 mounted on a box-like cover 25. The base 41 also carries on its flat surface an analyzer 37 and a split prism 38 which are secured by bonding and constitute an optical system acting on the reflected light returning from an optical disk, not shown. A pickup lens 39 is fastened to the base 41 along a slit (not designated) by means of screws extending from the backside of the base 41. The flat base 41 united with the optical components 32, 33, 36–39 is secured by bonding or fastening to the box-like cover 25 to close an open bottom end of the cover 25.

Throughout the bonding process, the optical components 32, 33, 36–38 such as prisms and mirrors must be kept in accurate position relative to one another. A bonding jig or jigs are, therefore, needed for positioning the optical components. The jig is placed or set from the top or the side of each component. This placement of jig sometimes causes irregular illumination of the optical components with light which is used for curing a photo-setting adhesive such as an ultraviolet-curing adhesive.

This irregular illumination problem never occurs in the case of this embodiment because the planar base 41 is made of a high light transmitting material. When projected onto the backside of the high light transmitting base 41, light passes the base 41 at uniform distribution and cures the adhesion. The optical components can, therefore, be bonded efficiently with utmost ease.

The optical components 32, 33, 36–38 such as prisms and mirrors are made of glass or plastic. It is preferable that the base 41 is made of the same material as the optical components. This is because the optical components and the base 41 made of the same material are unlikely to produce distortion due to thermal expansion and contraction when subjected to temperature changes after they are bonded together.

Although the adhesive used in the illustrated embodiments is a photo-setting adhesive such as an ultraviolet-curing adhesive, any other suitable adhesive may be used. Furthermore, the optical system is not limited to that of the illustrated embodiments.

As described above, the optical head of this invention is composed of a box-like cover carrying thereon a semiconductor laser unit and a detector, and a substantially planar base on which various optical components are bonded, the base being made of the same material as the box-like cover and secured to the box-like cover to close an open end of the latter. With this construction, there is provided a substantially non-limited space around the bonding surface. This large space increases the degree of freedom in designing a jig to such an extent that the resultant jig can position all the optical components at one time. Due to the absence of a wall surrounding the optical components, ultraviolet rays sufficiently irradiates the bonding surface to cure the ultraviolet-curing adhesive. Thus, the optical head can be assembled efficiently and easily.

Furthermore, the optical components such as prisms and mirrors and the planar base are assembled as a single unit while keeping their precise positional relationship. The thus assembled unit can easily be united with the box-like cover by means of screws or an adhesive.

It is preferable that the planar base on which the optical components such as prisms and mirrors are bonded is made of a material of high light transmission. By the use of such highly light transmittable base, light projected onto the backside of the base passes the base at a uniform distribution and cures the adhesive. This illumination method is effective to exclude substantially all limitations on the design of a jig and ensures a highly efficient assembling of the optical head. Furthermore, the light transmittable base may be made of the same material as the optical components, in which instance the optical components and the base are substantially free from distortion which would otherwise occur due to thermal expansion and contraction when subjected to temperature changes after they are bonded.

The optical head of this invention can, therefore, be assembled efficiently and less costly, is compact in size and low in profile, and can be constructed at a high component density.

Obviously various minor changes and modifications of the present invention are possible in the light of the above teaching. It is therefore to be understood that within the scope of the appended claims the invention may be practiced otherwise than as specifically described.

What is claimed is:

1. An optical head for recording and reproducing information on an optical disk, comprising:

(a) a semiconductor laser unit;

(b) a detector for detecting reflected light returning from the optical disk;

(c) a cover having a substantially U-shaped cross section and carrying thereon said semiconductor laser unit and said detector;

(d) a substantially planar base;

(e) at least one first optical component secured by bonding to said base and constituting a first optical system acting on a light beam emitted from said semiconductor laser unit, said first optical component including a beam shaping prism, a deflecting beam splitter or a composite prism comprised of a combination of the beam shaping prism and the deflecting beam splitter; and (f) at least one second optical component secured by bonding to said base and constituting a second optical system acting on the reflected light returning from the optical disk, said second optical component including a prism or a mirror, wherein said cover is secured to said base and covers said first and second optical components.

2. An optical head according to claim 1, wherein said base is made of the same material as that of the first and second optical components.

3. An optical head according to claim 1, wherein said base is made of a material of high light transmission.

4. An optical head according to claim 3, wherein said base is made of the same material as that of the first and second optical components.

5. An optical head according to claim 1, wherein said base has at least two lands on which said first and second optical components are bonded.

6. An optical head according to claim 1, wherein said base has a flat surface on which said first and second optical components are bonded.

* * * * *